United States Patent
Ruppert, Jr. et al.

(10) Patent No.: US 6,431,298 B1
(45) Date of Patent: Aug. 13, 2002

(54) DRIVE UNIT ASSEMBLY FOR AN ELECTRICALLY DRIVEN VEHICLE

(75) Inventors: Malcolm F. Ruppert, Jr., Cedar Falls, IA (US); Silvio Masaaki Yamada, Gahanna, OH (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/289,911

(22) Filed: Apr. 13, 1999

(51) Int. Cl.[7] ................................................. B60K 1/00
(52) U.S. Cl. ..................................... 180/65.7; 180/297
(58) Field of Search ............................. 180/65.1, 65.6, 180/65, 65.7, 291, 292, 297

(56) References Cited

U.S. PATENT DOCUMENTS

| | | | | |
|---|---|---|---|---|
| 1,233,846 A | * | 7/1917 | Cochran | |
| 1,481,405 A | | 1/1924 | Anglada | |
| 1,543,044 A | | 6/1925 | Anglada | |
| 1,661,780 A | * | 3/1928 | Warhus | |
| 2,589,863 A | | 3/1952 | Quartullo | |
| 3,136,379 A | * | 6/1964 | Lauster | |
| 3,575,250 A | * | 4/1971 | Dykes | 180/65.1 X |
| 3,621,929 A | * | 11/1971 | Oberthur | 180/65.1 X |
| 3,648,795 A | * | 3/1972 | Moulton | 180/65.1 X |
| 3,770,073 A | * | 11/1973 | Meyer | 180/65.1 X |
| 3,889,782 A | * | 6/1975 | Geis | 180/65.1 X |
| 3,902,565 A | * | 9/1975 | Farrall | 180/65 |
| 4,270,622 A | | 6/1981 | Travis | 180/65 |
| 4,339,015 A | * | 7/1982 | Fowkes et al. | 180/65 |
| 4,429,758 A | * | 2/1984 | Meshulam | 180/65.6 |
| 4,433,744 A | * | 2/1984 | Miihbacher | 180/292 X |
| 4,570,739 A | * | 2/1986 | Kramer | 180/65.1 X |
| 4,799,564 A | * | 1/1989 | Iijima et al. | 180/65.5 |
| 5,199,524 A | * | 4/1993 | Ivancic | 180/65.6 |
| 5,222,568 A | | 6/1993 | Higasa et al. | 180/65.5 |
| 5,382,854 A | * | 1/1995 | Kawamoto et al. | 180/65.5 |
| 5,419,406 A | * | 5/1995 | Kawamoto et al. | 180/65.6 |
| 5,443,130 A | * | 8/1995 | Tanaka et al. | 180/65.1 |
| 5,558,174 A | * | 9/1996 | Avitan et al. | 180/65.6 X |
| 5,662,184 A | * | 9/1997 | Riemer et al. | 180/65.1 |
| 5,667,029 A | * | 9/1997 | Urban et al. | 180/65.1 X |
| 5,715,901 A | * | 2/1998 | Tokushima | 180/65.5 |
| 5,743,348 A | * | 4/1998 | Coppola et al. | 180/65.1 X |
| 5,847,470 A | * | 12/1998 | Mitchell | 180/65.6 X |
| 5,924,504 A | * | 7/1999 | Ruppert, Jr. et al. | 180/65.6 X |
| 5,941,790 A | * | 8/1999 | Steen et al. | 180/65.6 X |
| 5,950,751 A | * | 9/1999 | McComber | 180/65.1 |
| 6,095,269 A | * | 8/2000 | Hosaka et al. | 180/65.6 X |
| 6,145,611 A | * | 11/2000 | Haddad, Sr. | 180/65.6 |
| 6,196,342 B1 | * | 3/2001 | Teal et al. | 180/65.1 X |

FOREIGN PATENT DOCUMENTS

GB 1303615 1/1973

* cited by examiner

Primary Examiner—Paul N. Dickson
Assistant Examiner—Toan To
(74) Attorney, Agent, or Firm—Carlson, Gaskey & Olds

(57) ABSTRACT

A vehicle drive unit assembly includes a rear drive axle extending between a pair of vehicle wheels. An input shaft is operably connected to the drive axle to provide torque to the drive axle to drive the vehicle wheels. An electric motor is connected to the input shaft and is mounted above the drive axle. Preferably, the electric motor is mounted adjacent to the differential in the drive axle. A reduction gear box or chain drive assembly interconnects the electric motor to the input on the drive axle to reduce the input speed to the axle from the motor.

25 Claims, 4 Drawing Sheets

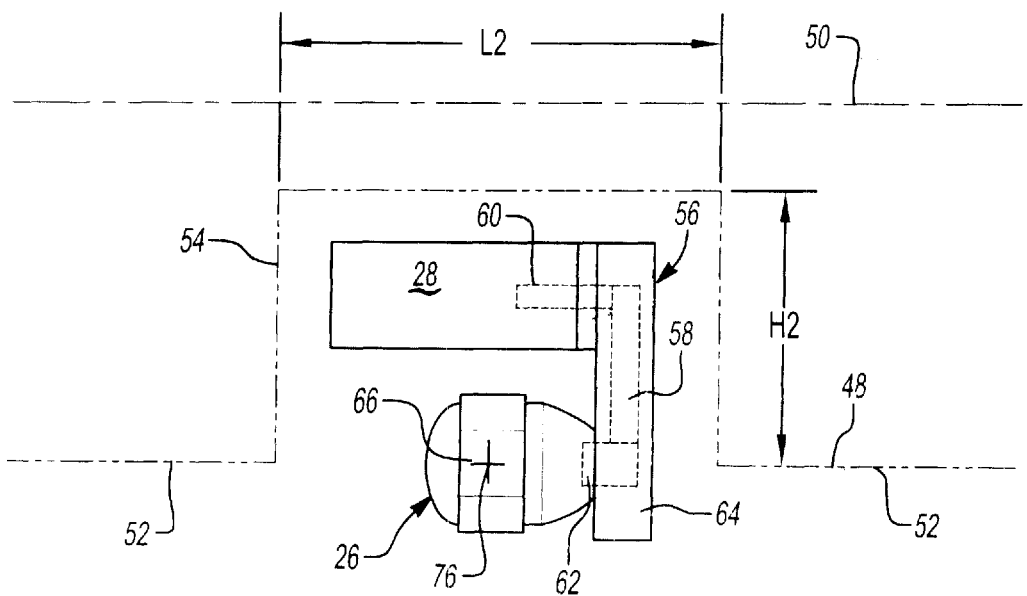
*Fig-3A*
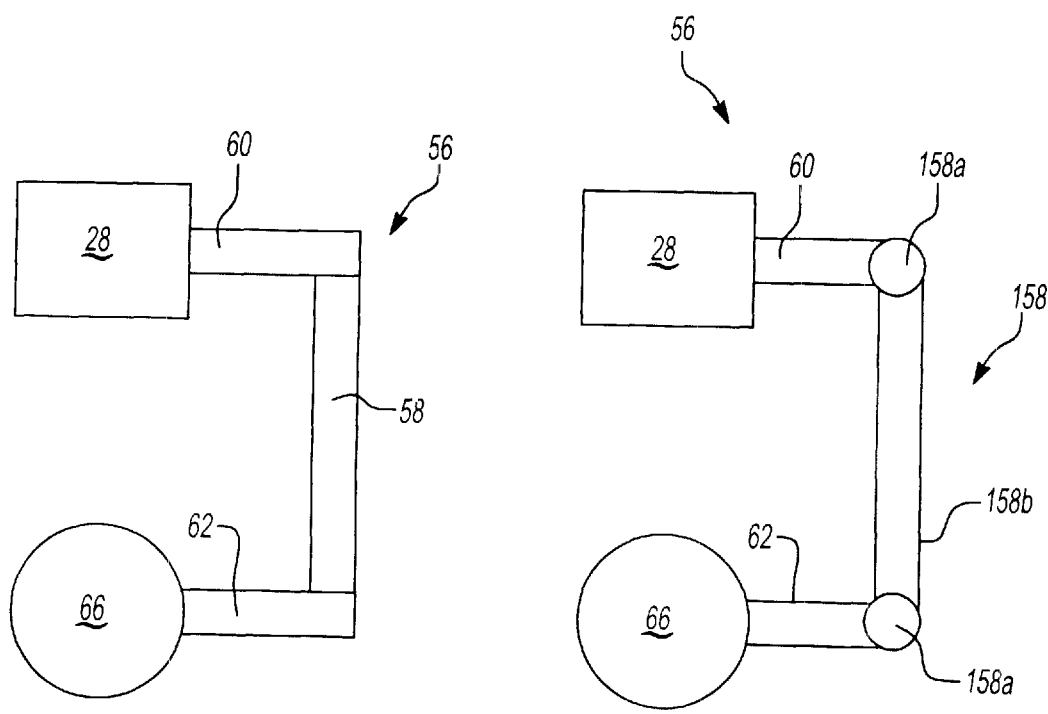
*Fig-3B*   *Fig-3C*

DRIVE UNIT ASSEMBLY FOR AN ELECTRICALLY DRIVEN VEHICLE

BACKGROUND OF THE INVENTION

This invention relates to a unique drive arrangement for electrically driving a vehicle such that the floor profile of the vehicle can be significantly lower along a greater length of the vehicle than was the case in the prior art.

Mass transit vehicles, such as buses or trolley cars, typically have seats aligned at the lateral sides of the vehicle, with a central aisle and floor extending along the vehicle. In order to facilitate entering and exiting from the vehicle, it would be desirable to have the vehicle floor and aisle positioned relatively low to the ground. This would provide increased passenger space within the body of the vehicle, and may allow the overall height of the mass transit vehicle to be reduced. Other advantages to having a lower floor profile include improved handicapped access and greater ease in the loading and unloading of passengers.

Mass transit vehicles typically have several axles which support and drive or steer the vehicle. Recently, applicant has proposed electric motor drives for such vehicles. If the axle is a driving axle, then electric motors can be used to generate torque to drive the wheels. In a typical configuration, a centrally located electric motor drives two opposed wheels at the sides of the vehicle by way of a conventional axle. A driveshaft is used to connect the motor to the axle. The electric motor, driveshaft, and axle are connected to each other in line along a longitudinal axis of the vehicle.

This configuration takes up a significant amount of packaging space and requires the floor profile to be raised to clear the motor, driveshaft and axle. Because these components are aligned along the longitudinal axis of the vehicle, the floor profile must be raised for a significant length of the vehicle. Raising the floor profile in such a manner reduces the amount of available passenger space within the vehicle and requires the passengers to climb up to a platform above the axle.

Thus, it is desirable to have an electric motor mounting configuration that reduces the length over which the floor profile has to be raised. This increases the available passenger space within the vehicle and allows for a greater portion of the vehicle floor to be closer to the ground to improve access to the vehicle.

SUMMARY OF THE INVENTION

A vehicle drive unit assembly includes a rear drive axle extending between a pair of vehicle wheels. An input is operably connected to the drive axle to provide torque to the drive axle to drive the vehicle wheels. An electric motor is connected to the input and is mounted above the drive axle. Preferably, the electric motor is mounted directly above the differential in the drive axle.

This mounting configuration improves packaging and increases passenger compartment size by moving the electric motor above the drive axle. This allows the interior vehicle floor to be lowered along a greater length of the vehicle resulting in improved utilization of the passenger compartment.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3A is a side schematic view of the electric motor mounting of the subject invention.

FIG. 3B is a schematic view of one embodiment of a drive connection of FIG. 3A.

FIG. 3C is a schematic view of an alternate embodiment of the drive connection of FIG. 3A.

DETAILED DESCRIPTION OF A PREFERRED EMBODIMENT

Figure 1:
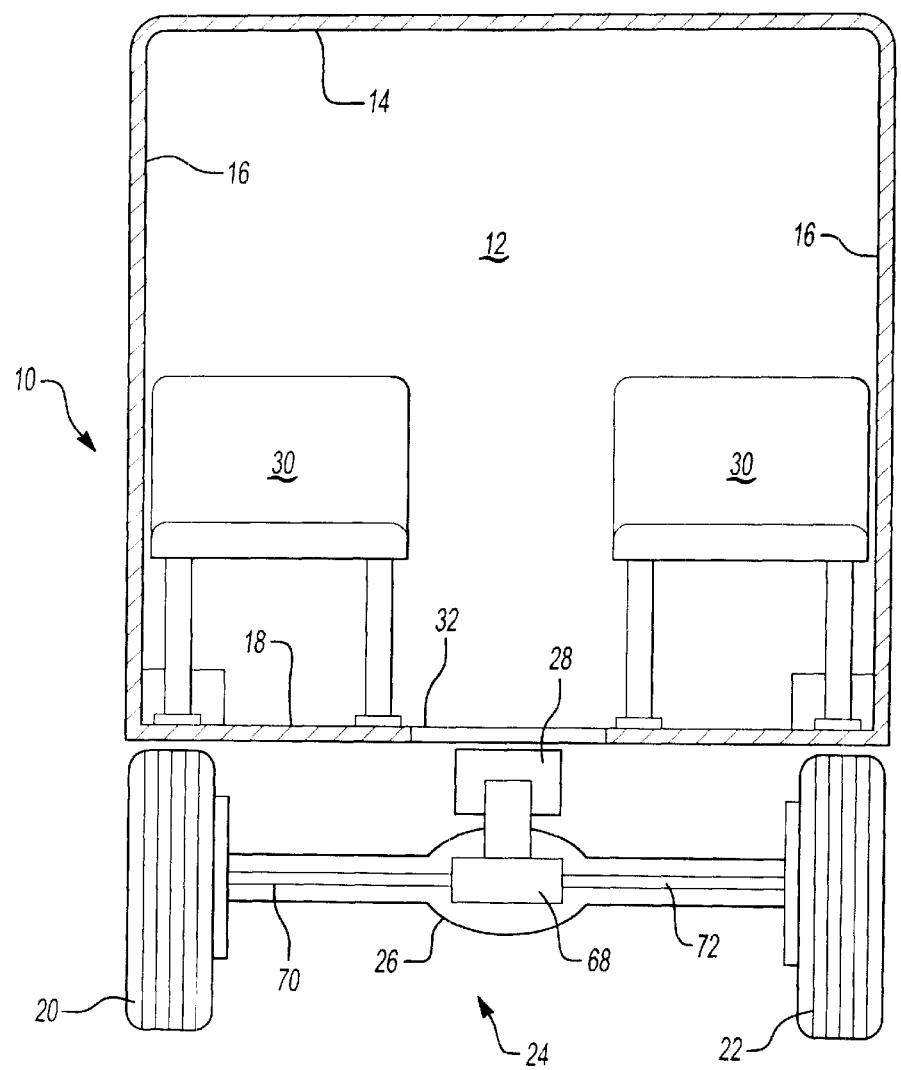
FIG. 1 is a cross sectional view of a vehicle incorporating the subject invention.

Referring to the Figures, wherein like numerals indicate like or corresponding parts throughout the several views, an automotive vehicle is shown generally at 10. As shown in FIG. 1, automotive vehicle 10 includes a passenger compartment 12 defined by a roof 14, two side walls 16, and a vehicle floor 18. A pair of wheels 20, 22 are driven by an automotive vehicle drive unit assembly, generally shown at 24, which includes a drive axle 26 and an electric motor 28. It should be understood that vehicle 10 is typically provided with additional axles, drive and/or non-drive axles, and several pairs of wheels.

In the preferred embodiment, the vehicle 10 is a bus with passenger seats 30 mounted adjacent to each of the side walls 16 with a center aisle 32 extending along the length of the vehicle 10 between the seats 30. In order facilitate entering and exiting from the vehicle 10, it is desirable to have the vehicle floor 18 and aisle 32 positioned relatively low to the ground. This provides increased passenger space 12 within the body of the vehicle 10.

Figure 2:
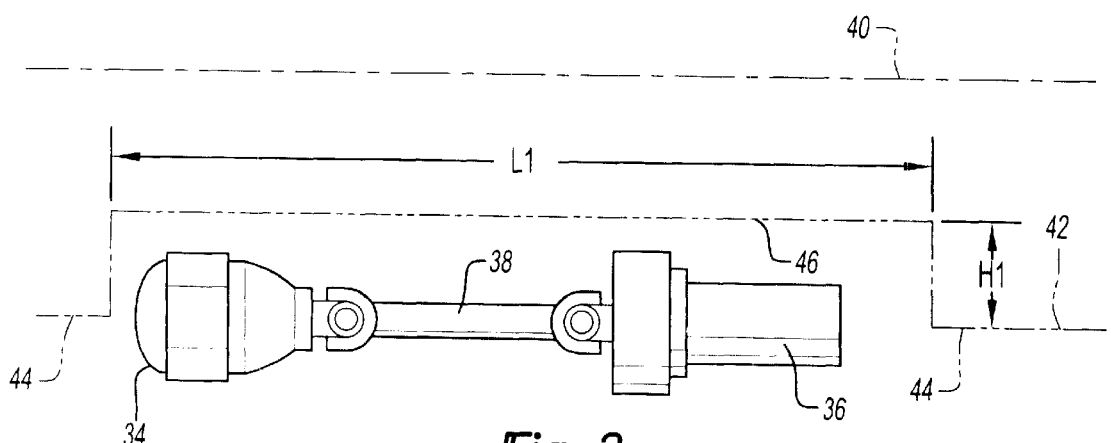
FIG. 2 is a side schematic view of a prior art electric motor mounting.

In prior art configurations, shown in FIG. 2, a drive axle 34 is connected to an electric motor 36 by a driveshaft 38 along a longitudinal axis 40 of a vehicle. A floor profile 42 for the vehicle includes a first profile segment 44 and a second profile segment 46. The second profile segment 46 is higher than the first profile segment 44 because the vehicle floor has to be raised in order to go over the axle 34 and electric motor 36. The second profile segment 46 has a height H1 and a length L1. The increased height H1 of the second profile segment 46 extends along a great length L1 of the vehicle due to the in-line configuration of the axle 34, driveshaft 38, and electric motor 36. This configuration takes up a great deal of available packaging space beneath the vehicle and raises the floor profile 42 making it more difficult for passengers to move about the vehicle.

In a typical vehicle, the motor 36 is rigidly attached to the vehicle frame, but the axle moves up and down as allowed by the suspension to provide a smooth ride for the passengers. Length L1 cannot be shortened without effecting the length of driveshaft 38. Driveshaft 38 needs to be as long as possible to minimize the operating angle of the joints on each end of the driveshaft 38 as the axle moves on the suspension.

The inventive drive unit assembly 24, shown in FIG. 3, increases the amount of packaging space available underneath the vehicle 10 and allows a vehicle floor profile 48 to be lowered for a significantly greater length along a longitudinal axis 50 of the vehicle 10, by mounting the electric motor 28.above the axle 26.

The floor profile 48 includes a first profile segment 52 and a second profile segment 54. The second profile segment 54 has a height H2 and a length L1 and is higher than the first profile segment 52, i.e. the first profile segment 52 is closer to the ground than the second profile segment 54. When the electric motor 38 is mounted above the axle 26, the height H2 of the second profile segment 54 may be slightly increased compared to the height H1 of floor profiles 42 in the prior art, but the length L2 of the second profile segment 54 is significantly shortened, allowing the floor 18 to be closer to the ground along a greater length of the vehicle 10.

A gear box assembly or chain drive 56 as shown is FIG. 3A, is used to connect the electric motor 28 to the drive axle 26. The gear box assembly 56 includes a gearset 58 shown is FIG. 3B that is driven by an output shaft 60 of the electric motor 28. The gearset 58 is operably connected to an input 62 of the axle 26. A gear box housing 64 substantially encloses the gearset 58 and is mounted by means well known in the art to the electric motor 28 and the axle 26 to prevent contaminants from interfering with the operation of the gearset 58. Preferably, the gear box housing 64 is mounted vertically with respect to the drive axle 16.

While a gear box assembly 56 is preferred, a chain drive mechanism 56 could also be used instead of the gear box to connect the electric motor 28 to the drive axle 26. The chain drive 56 includes a chain sprocket and pulley set 158 with pulleys 158a and a chain drive 158b that is driven by the output shaft 60 of the electric motor 28 and is operably connected to the input 62 of the axle 26. A chain sprocket housing 64 encloses the pulleys 158a and the chain drive 158 and is mounted to the motor 28 and axle 26. The gear box assembly and chain drive mechanism 56 are well known, and are shown schematically in FIG. 3A.

The gear box assembly or chain drive 56 is used to reduce the rotational input speed supplied by the electric motor 28 to the axle 26 and also increases the torque supplied by the electric motor 28 to the axle 26. The gearset 58 can include any type of gears known in the art, and can be configured for various reduction gear ratios as is known in the art. Likewise, the chain drive can be configured for reduction.

Figure 4:
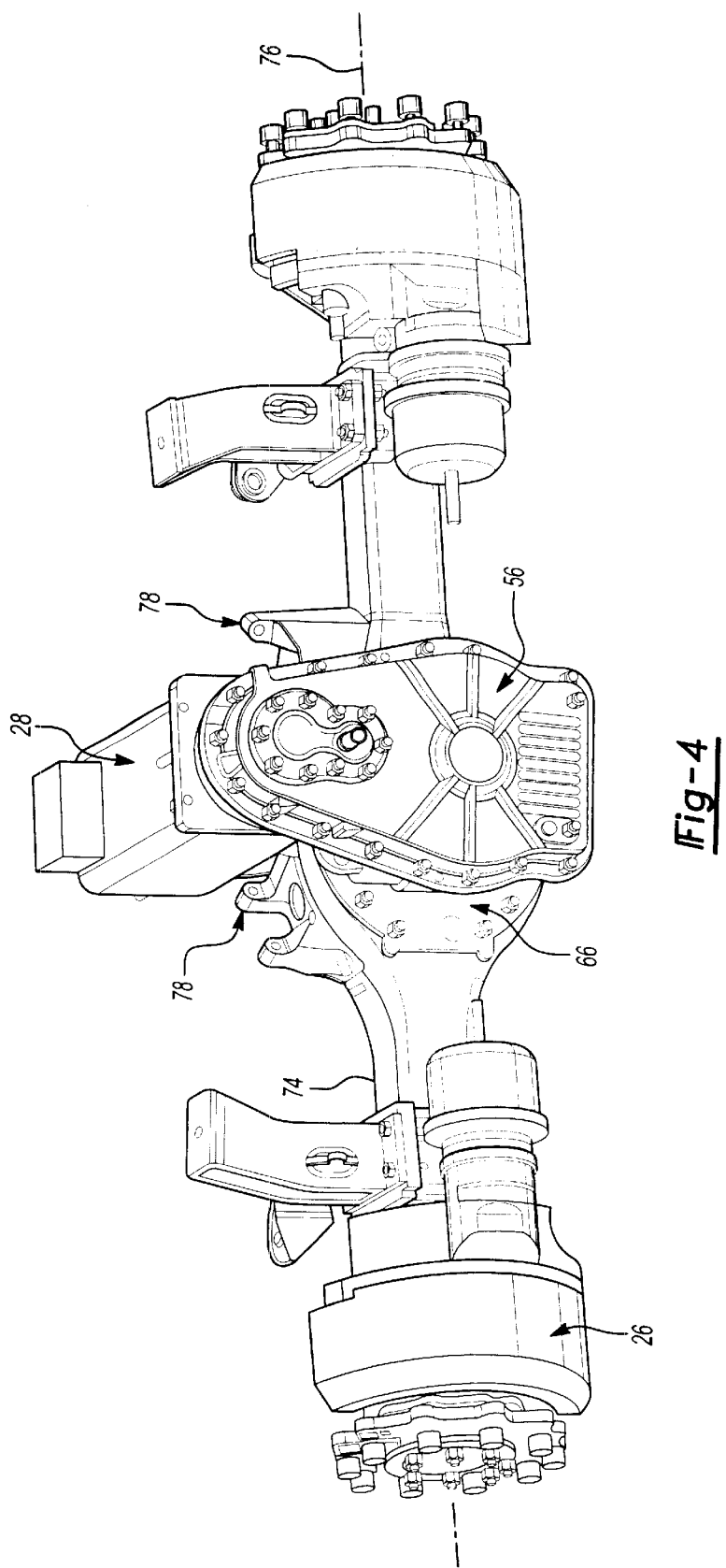
FIG. 4 is a perspective view from one side of a drive axle with the inventive mounting arrangement.
Figure 5:
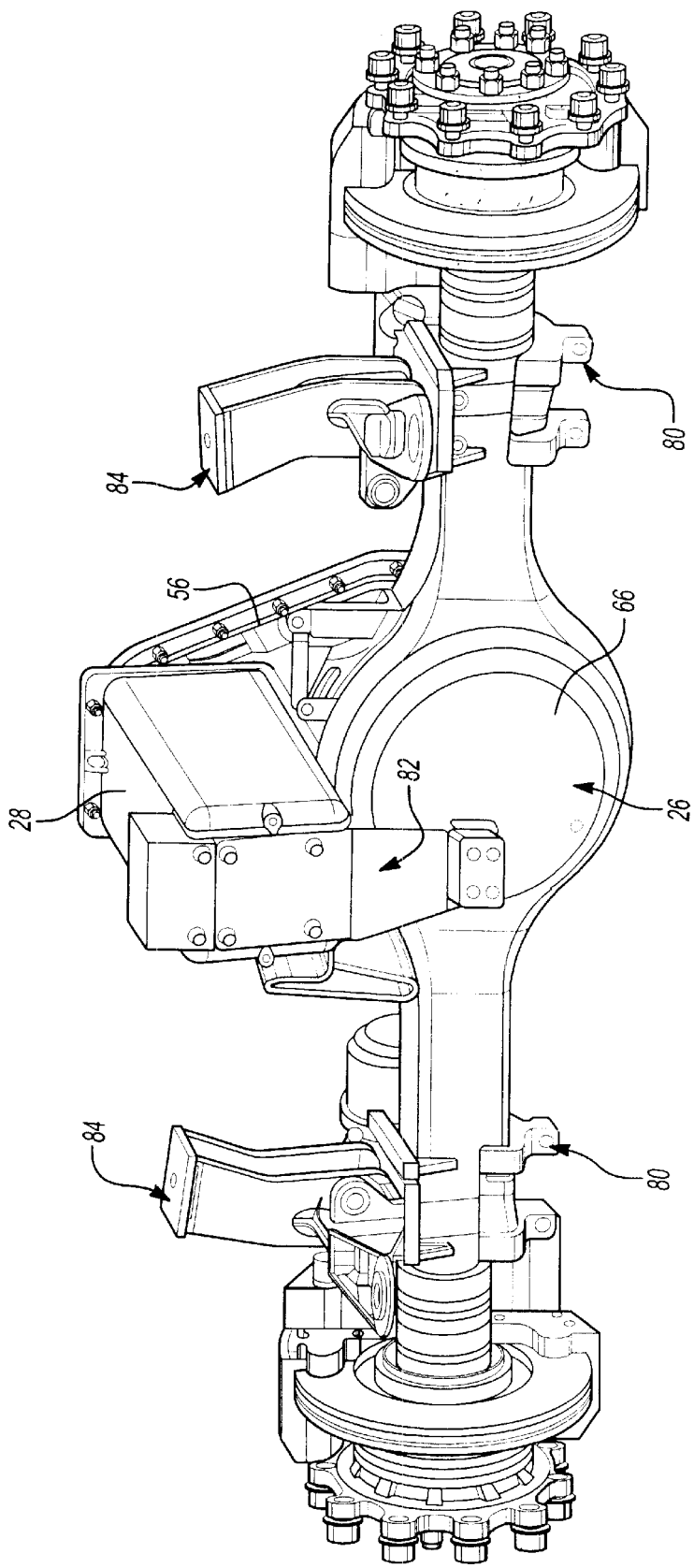
FIG. 5 is a view like FIG. 4, but from an opposite side of the axle.

The drive axle 26 and electric motor 28 are shown in greater detail in FIGS. 4 and 5. The drive axle 26 includes an axle housing 74 and a central differential 66 with a gear assembly 68 used to drive a pair of axle shafts 70, 72, which in turn drive the vehicle wheels 20, 22, see FIG. 1. The input 62 to the axle 26 transmits torque and speed from the electric motor 28 and gear box 56 to the gear assembly 68. The axle housing 74 encloses the gear assembly 68 and the axle shafts 70, 72 to keep out contaminants. The drive axle 26 defines a lateral axis 76 that is transverse to the longitudinal axis 50 of the vehicle 10

In the preferred embodiment, the electric motor 28 is mounted directly over the center differential 66, however, the motor 28 could also be mounted adjacent to the side of the differential 66, which will somewhat reduce the height H2 in FIG. 3.

With the present invention, the benefits, as shown in particular in FIG. 3, are achieved. By mounting the electric motor 28 directly above the drive axle 26, the vehicle floor 18 is lowered along a significantly greater length of the vehicle than vehicle floors shown in the prior art.

In the preferred embodiment, the axle 26 includes a pair of upper suspension link brackets 78 (FIG. 4) and a pair of lower suspension link brackets 80 (FIG. 5) for connecting the axle 26 to a vehicle suspension (not shown). Additional brackets 84 are also used to support the axle 26 on the vehicle. While various bracket assemblies are shown in this embodiment, it should be understood that other mounting methods known in the art can be used to mount the axle 26 to a vehicle suspension.

A support plate 82 is used to help support the weight of the electric motor 28 with respect to the axle 26. The plate 82 is connected to the electric motor 28 at one end and to the differential 66 at the other end by a plurality of fasteners. The plate 82 is mounted to a side of the axle 6 that is opposite from where the gear box assembly 56 is mounted.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

We claim:

1. A vehicle drive unit assembly comprising:
   a drive axle extending between a pair of laterally spaced vehicle wheels and including a centrally positioned differential;
   an input extending along a longitudinal axis and operably connected to said drive axle to drive the vehicle wheels about a lateral axis of rotation transverse to said longitudinal axis;
   an electric motor connected to said input and mounted directly above said differential.

2. An assembly as set forth in claim 1 wherein said electric motor includes an output that is operably connected to said input by a gear box assembly.

3. An assembly as set forth in claim 2 wherein said gear box assembly includes a reduction gear set for reducing rotational input speed from said output to said input.

4. An assembly as set forth in claim 2 wherein said gear box assembly includes a housing mounted vertically with respect to said drive axle.

5. An assembly as set forth in claim 2 wherein said differential includes a differential gear assembly for driving a pair of axle shafts, said differential gear assembly being coupled to said gear box assembly.

6. An assembly as set forth in claim 1 wherein said electric motor includes an output that is operably connected to said input by a chain drive assembly.

7. An assembly as set forth in claim 6 wherein said chain drive assembly includes a chain sprocket and a plurality of pulleys configured to provide reduced rotational input speed from said output to said input.

8. An assembly as set forth in claim 1 wherein said electric motor is mounted at a vertically higher position relative to ground level than said drive axle.

9. An assembly as set forth in claim 2 wherein said input and outputs rotate about respective longitudinal axes of rotation parallel to said longitudinal axis.

10. A drive unit assembly for a vehicle comprising:
    a drive axle having an axle housing extending between a pair of vehicle wheels, a differential gear assembly centrally located within said axle housing, a first axle shaft for transmitting driving torque from said differential gear assembly to one of the vehicle wheels, and a second axle shaft for transmitting driving torque from said differential to the other of the vehicle wheels, said first and second axle shafts defining a lateral axis of rotation;

an input shaft defining a longitudinal axis of rotation transverse to said lateral axis of rotation and operably connected to said differential gear assembly to drive said first and second axle shafts; and an electric motor operably coupled to said input shaft wherein said electric motor is mounted directly above said differential gear assembly.

11. An assembly as set forth in 10 wherein said electric motor includes an output shaft that is operably connected to said input shaft by a gear box assembly.

12. An assembly as set forth in 11 wherein said gear box assembly includes a reduction gear set and a housing, said housing being mounted vertically with respect to said drive axle.

13. An assembly as set forth in claim 11 wherein said electric motor is mounted to said gear box assembly adjacent to said differential gear assembly.

14. An assembly as set forth in claim 11 wherein said output shaft is parallel to said input shaft and said gear box assembly includes a reduction gear set for reducing rotational input speed from said output shaft to said input shaft.

15. A vehicle comprising:

a vehicle body defining a longitudinal axis and extending between lateral sides;

passenger seats mounted adjacent each of said lateral sides;

a floor defined beneath said passenger seats, said floor having a profile with at least two profile segments wherein a first profile segment extends along said longitudinal axis for a first length and a second profile segment extends along said longitudinal axis for a second length, said second profile segment being higher than said first profile segment relative to ground level;

a drive axle extending between a pair of vehicle wheels and defining a lateral axis that is transverse to said longitudinal axis;

an input operably connected to said drive axle for providing torque to said axle to drive the vehicle wheels; and an electric motor connected to said input and mounted above said drive axle to reduce said length of said second profile segment relative to said: first profile segment.

16. A vehicle as set forth in claim 15 wherein said drive axle includes an axle housing extending between the vehicle wheels, a differential gear assembly centrally located within said axle housing, a first axle shaft for transmitting driving torque from said differential gear assembly to one of the vehicle wheels, and a second axle shaft for transmitting driving torque from said differential to the other of the vehicle wheels.

17. A vehicle as set forth in claim 16 wherein said electric motor includes an output that is operably connected to said input by a gear box assembly.

18. A vehicle as set forth in claim 17 wherein said gear box assembly includes a reduction gear set and a housing, said housing being mounted vertically with respect to said drive axle.

19. A vehicle as set forth in claim 18 wherein said electric motor is mounted to said gear box assembly adjacent to said differential gear assembly.

20. A vehicle as set forth in claim 16 wherein said electric motor includes an output that is operably connected to said input by a chain drive assembly including a chain sprocket, a plurality of pulleys, and a housing, said housing being mounted vertically with respect to said drive axle.

21. A vehicle as set forth in claim 15 wherein said electric motor is mounted directly over a center portion of said drive axle to increase the height of said second profile segment relative to said first profile segment while reducing said length of said second profile segment relative to said first profile segment.

22. An assembly as set forth in claim 15 wherein said electric motor is mounted at a vertically higher position relative to ground level than said drive axle.

23. A vehicle drive unit assembly comprising:

a drive axle defining a lateral axis of rotation extending between a pair of vehicle wheels and including a differential;

an input defining a longitudinal axis of rotation transverse to said lateral axis of rotation and operably connected to said differential to drive the wheels; and an electric motor connected to said input and mounted above said drive axle at a vertically higher position relative to ground level than said differential wherein, said electric motor is positioned centrally between the wheels and mounted directly over said differential.

24. An assembly as set forth in claim 23 wherein said differential is positioned centrally on said drive axle between the wheels.

25. An assembly as set forth in claim 24 wherein said differential is positioned at an approximately equal distance from each of the wheels.

* * * * *